United States Patent [19]

Mori et al.

[11] Patent Number: 4,582,978
[45] Date of Patent: Apr. 15, 1986

[54] METHOD FOR GAS METAL ARC WELDING OF VERY LOW CARBON STEEL

[75] Inventors: Naomichi Mori; Hiroyuki Honma; Masakuni Wakabayashi; Tsuyoshi Takino, all of Sagamihara, Japan

[73] Assignee: Nippon Steel Corporation, Tokyo, Japan

[21] Appl. No.: 705,858

[22] Filed: Feb. 27, 1985

Related U.S. Application Data

[63] Continuation of Ser. No. 415,883, Sep. 7, 1982, abandoned.

[30] Foreign Application Priority Data

Sep. 8, 1981 [JP] Japan .................................. 56-140383

[51] Int. Cl.$^4$ .............................................. B23K 9/23
[52] U.S. Cl. .......................................... 219/137 WM
[58] Field of Search .................. 219/137 WM, 137 R

[56] References Cited

FOREIGN PATENT DOCUMENTS 1490772 11/1977 United Kingdom ....... 219/137 WM

Primary Examiner—C. L. Albritton
Assistant Examiner—Alfred S. Keve
Attorney, Agent, or Firm—Wenderoth, Lind & Ponack

[57] ABSTRACT

Method for gas metal arc welding of very low carbon steel in which a crack-free region where high temperature cracking does not occur is obtained by controlling the carbon content of the weld metal.

2 Claims, 3 Drawing Figures

METHOD FOR GAS METAL ARC WELDING OF VERY LOW CARBON STEEL

This application is a continuation of now abandoned application Ser. No. 415,883, filed Sept. 7, 1982.

BACKGROUND OF THE INVENTION

1. Field of the Invention

The present invention relates to a method for gas metal arc welding of steel containing 0.005–0.06%C by weight.

2. Description of the Prior Art

Quite recently, with the remarkable progress of the controlled rolling process, there is a general tendency for steel products, including those for making a large diameter line pipe, to be produced with a very low percentage of carbon by weight so as to give these products improved weldability and to reduce the cost of production.

It has been generally considered that the susceptibility of such very low carbon steels to high temperature cracking of the weld metal is generally low. However, although the reduction of the carbon content of the weld metal has generally proved to be beneficial in the welding of steel from the viewpoint of preventing the high temperature cracking of the weld metal, an extensive investigation conducted by the present inventors shows that high temperature cracking tends to occur despite a sufficiently low content of carbon in the weld metal when gas metal arc welding of very low carbon steels containing less than 0.06%C weight is carried out using known welding materials.

SUMMARY OF THE INVENTION

It is the main object of the present invention to provide a gas metal arc welding method for a very low carbon steel by which there is obtained a stable region in which high temperature cracking does not occur on the weld metal.

It is another object of the invention to provide a gas metal arc welding method for a very low carbon steel by which a stable region in which high temperature cracking does not occur is obtained by controlling the carbon content of the weld metal.

BRIEF DESCRIPTION OF THE DRAWINGS

Other and further objects of the invention will be better understood from the following detailed description with reference to the accompanying drawings, in which.

DETAILED DESCRIPTION OF THE INVENTION

The gist of the present invention consists in a gas metal arc welding method wherein a very low carbon steel containing 0.005–0.06%C by weight is welded on at least the first layer of a weld by the gas metal arc welding method using a solid wire containing 0.09–0.33%C by weight.

The $CO_2$ shielded arc welding method in which $CO_2$ gas is used as a shielding gas is well known, and the gas metal arc welding method of this invention refers to an arc welding method wherein a solid wire is continuously fed in the atmosphere of a shielding gas. In this invention, $CO_2$ gas is used as the shielding gas, but it is understood that the invention is not limited to exclusive use of $CO_2$ gas.

It is an established theory in the welding industry that the amount of carbon contained in a weld metal should be controlled to the same level as or to a lower level than that of the parent metal in order to reduce susceptibility to high and low temperature cracking and to improve toughness. Thus, it has been considered that if the carbon amount is less than 0.15% by weight, high temperature cracking will not occur. It has also been believed, from an interpolation of the above theory, that this holds true if the carbon content is less than 0.1% by weight.

On the other hand, however, our investigation showed that the susceptibility to high temperature cracking of the weld metal of very low carbon steel subjected to gas metal arc welding using the conventional solid wire is not lower but higher. This is shown in FIG. 1.

Figure 1:
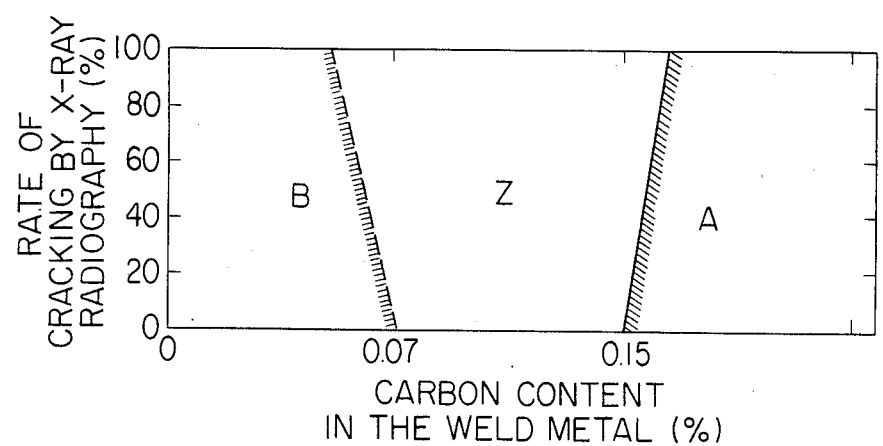
FIG. 1 is a graphic view showing the relation between the carbon content (% by weight) contained in the weld metal and the rate (%) of cracking evaluated by the X-ray radiography technique.

FIG. 1 indicates the relation between the carbon content (%) of the weld metal and the rate (%) of cracking evaluated by the X-ray radiography technique. Here it is seen that, as experienced heretofore, high temperature cracking occurs in the region A, where the carbon content exceeds 0.15% by weight, and also occurs in the region B of less than 0.07%C by weight. Between these regions there was discovered a stable region Z where no cracking occurs. In other words, it has been clearly proved that the susceptibility to high temperature cracking of the weld metal becomes greater if the C content is less than a certain limit, which is totally contrary to what has been considered as common knowledge in the welding industry up until now.

The reason for this is considered to be as follows: in the low carbon region, an interdendritic region undergoes δ solidification, and to reduce cracking, it is necessary to increase the amount of carbon which acts as a γ stabilizing element.

Accordingly, steels to which this invention can be applied are very low carbon steels for general structural use and low alloy steels for cryogenic service containing not more than 0.06%C by weight and not less than 0.005%C by weight, which lower value is regarded as the minimum C content required for a steel to have sufficient strength. The invention cannot, however, be applied to such low carbon steels as stainless steel.

The dilution rate of the parent metal depends upon the welding conditions. It has been confirmed that the dilution rate is about 40–50% within the groove angle.

In view of the above findings, it has been found that the amount of carbon in the weld metal where no high temperature cracking occurs is given by the following formula:

$$0.07 \leq C_{WM} = \beta C_P + (1-\beta)\alpha C_W \leq 0.15$$

where $C_{WM}$: carbon content of weld metal, (%)
$C_P$: carbon content of steel, (%)
$C_W$: carbon content of wire, (%)
α: yield rate of carbon
β: dilution rate of parent metal.

On the basis of our research, we have established that a weld metal satisfying the above requirements can be obtained by applying the gas metal arc welding method using a solid wire having a carbon content controlled within the range of 0.09–0.33% by weight.

As described hereinbefore, the steel contains 0.005–0.06%C by weight, and the solid wire contains 0.09–0.33%C by weight. However, when the steel has a low content of carbon, it follows that the solid wire should have a high content of carbon. On the other hand, if the steel has a high content of carbon, the solid wire should have a low content of carbon. A most preferred content of carbon in the solid wire is in the range of 0.16–0.30% by weight.

The solid wire used in this invention contains a suitable amount of Mn, Si, Al and Ti as a deoxidizing element. The welding conditions of the present invention are not specifically limited, but, in the case of multipass welding, at least the first layer should be welded by the method of the present invention.

Examples of the present invention are described hereinbelow.

EXAMPLE 1

A steel product containing 0.16%Si, 1.8%Mn, 0.016%P, 0.003%S, 0.005%C (percentages being by weight), and the remainder Fe was used.

Figure 2:
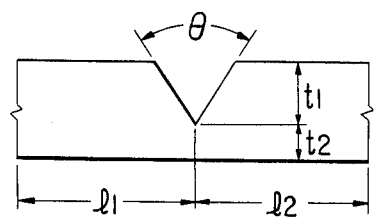
FIG. 2 shows the joint geometry of a high temperature cracking test plate.

The form of the groove angle (see FIG. 2):
$\theta$: 60°
$t_1$: 20 mm
$t_2$: 15 mm
$l_1$: 150 mm
$l_2$: 150 mm
Wire diameter: 1.6 mm$\phi$
Electric current: 400 A
Voltage: 37 V
Speed: 45 cm/min.
Shielding gas: $CO_2$ 100%, 25 l/min.

After welding, the presence or absence of cracking was investigated by the X-ray radiography technique. The results are shown in Table 1.

TABLE 1

| C content of Wire, (%) | 0.08 | 0.16 | 0.20 | 0.24 | 0.30 | 0.35 |
|---|---|---|---|---|---|---|
| C content of Weld Metal, (%) | 0.04 | 0.07 | 0.09 | 0.11 | 0.14 | 0.16 |
| Cracking | yes | no | no | no | no | yes |

Yield rate of carbon: 0.9
Dilution rate of parent metal: 0.5

EXAMPLE 2

A steel product containing 0.16%Si, 1.8%Mn, 0.016%P, 0.003%S, 0.03%C (percentages being by weight), and the remainder Fe was used. The form of the groove angle and the welding conditions were the same as in Example 1.

After welding, the presence of cracking was investigated by the X-ray radiography technique. The results are shown in Table 2.

TABLE 2

| C content of Wire, (%) | 0.08 | 0.16 | 0.20 | 0.24 | 0.30 | 0.35 |
|---|---|---|---|---|---|---|
| C content of Weld Metal, (%) | 0.05 | 0.09 | 0.11 | 0.12 | 0.15 | 0.17 |
| Cracking | yes | no | no | no | no | yes |

Yield rate of carbon: 0.9
Dilution rate of parent metal: 0.5

EXAMPLE 3

A steel product containing 0.16%Si, 1.8%Mn, 0.016%P, 0.003%S, 0.06%C (percentages being by weight) and the remainder Fe was used. The form of the groove angle and the welding conditions were the same as in Example 1.

After welding, the presence of cracking was investigated by the X-ray radiography technique. The results are shown in Table 3.

TABLE 3

| C content of Wire, (%) | 0.08 | 0.10 | 0.16 | 0.24 | 0.35 |
|---|---|---|---|---|---|
| C content of Weld Metal, (%) | 0.067 | 0.075 | 0.10 | 0.14 | 0.19 |
| Cracking | yes | no | no | no | yes |

Yield rate of carbon: 0.9
Dilution rate of parent metal: 0.5

EXAMPLE 4

A steel plate, 25 mm thick, containing 0.16%Si, 1.8%Mn, 0.16%P, 0.003%S, 0.35%Ni, 0.21%Mo, 0.02%Nb, and 0.03%C, was formed to a welded pipe of 48-inch diameter. Table 4 shows the wire composition used.

TABLE 4

| | C | Si | Mn | P | S | Mo | Ti | (wt. %) B |
|---|---|---|---|---|---|---|---|---|
| This invention | 0.24 | 0.35 | 1.71 | 0.008 | 0.006 | 0.25 | 0.02 | 0.0018 |
| Comparison | 0.09 | 0.45 | 1.92 | 0.009 | 0.011 | 0.49 | | |

The diameter of the solid wire was 4.0 mm$\phi$, respectively.

Figure 3:
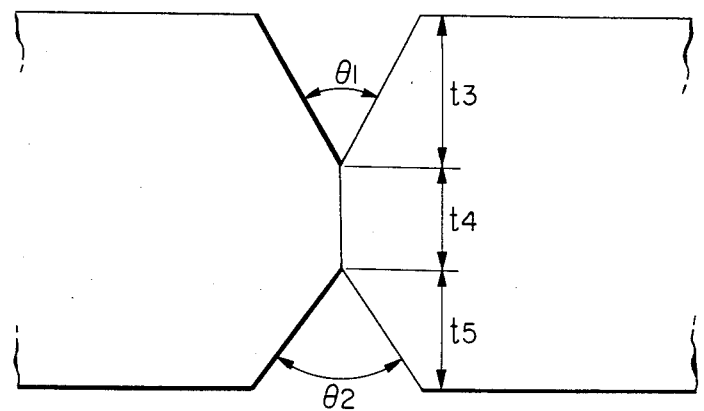
FIG. 3 shows the joint geometry of a high temperature cracking steel test pipe.

The form of the groove angle was applied as in FIG. 3.
$\theta_1$: 50°
$\theta_2$: 50°
$t_3$: 9.5 mm
$t_4$: 6 mm
$t_5$: 9.5 mm
Welding condition:
 Preceding electrode: 780 A, 30 V
 Trailing electrode: 680 A, 27 V
 Shielding gas: Ar20%–$CO_2$80%
 Gas flow volume: 50 l/min.
 Distance between electrodes: 33.5 cm
 Welding speed: 55 cm/min.
 A single welding pass for each side
 The carbon content of the weld metal ($\alpha$=0.9, $\beta$=0.5) was as follows:
 This invention: 0.123
 Comparison: 0.055

After welding, the presence or absence of cracking was investigated by the X-ray radiography technique. The results were as follows: no cracking occurred in the wire of this invention while, on the contrary, the occurrence of cracking was observed in the wire for comparison.

The results of Charpy test (−40° C.) are shown in Table 5 (the position of taking a specimen: 2 mm under the surface of the final pass).

TABLE 5

| | Average value of five specimens | Lowest value |
|---|---|---|
| | | (Kg · m) |
| This invention | 15.2 | 11.8 |
| Comparison | 6.2 | 2.1 |

As fully indicated and described in the foregoing, when the above requirements of the present invention was satisfied no high temperature cracking occurred in the weld metal at all.

We claim:

1. A method for gas metal arc welding which comprises:

providing a steel containing 0.005–0.06%C by weight; and subjecting said steel to gas metal arc welding in a shielding gas atmosphere with the use of a solid wire containing 0.16–0.30%C by weight, said gas metal arc welding being applied in producing at least a first weld layer;

whereby a weld metal containing 0.10–0.15%C by weight determined by the following formula is obtained, said weld metal having a two-phase $\delta+\gamma$ structure and excellent resistance to high temperature cracking:

$$C_{WM} = \beta C_P + (1-\beta)\alpha C_W$$

where
$C_{WM}$: C content of weld metal (%)
$\beta$: dilution rate of parent metal
$\alpha$: yield rate of C
$C_P$: C content of steel (%)
$C_W$: C content of wire (%).

2. A method as claimed in claim 1, wherein said steel contains 0.03%C by weight, 0.35%Ni by weight and 0.02%Nb by weight, and said steel is subjected to said gas metal arc welding with the use of said solid wire containing 0.24%C by weight to obtain said weld metal containing 0.123%C by weight.

* * * * *